B. R. DUVAL.
Improvement in Safety-Bridles.
No. 130,794.  Patented Aug. 27, 1872.
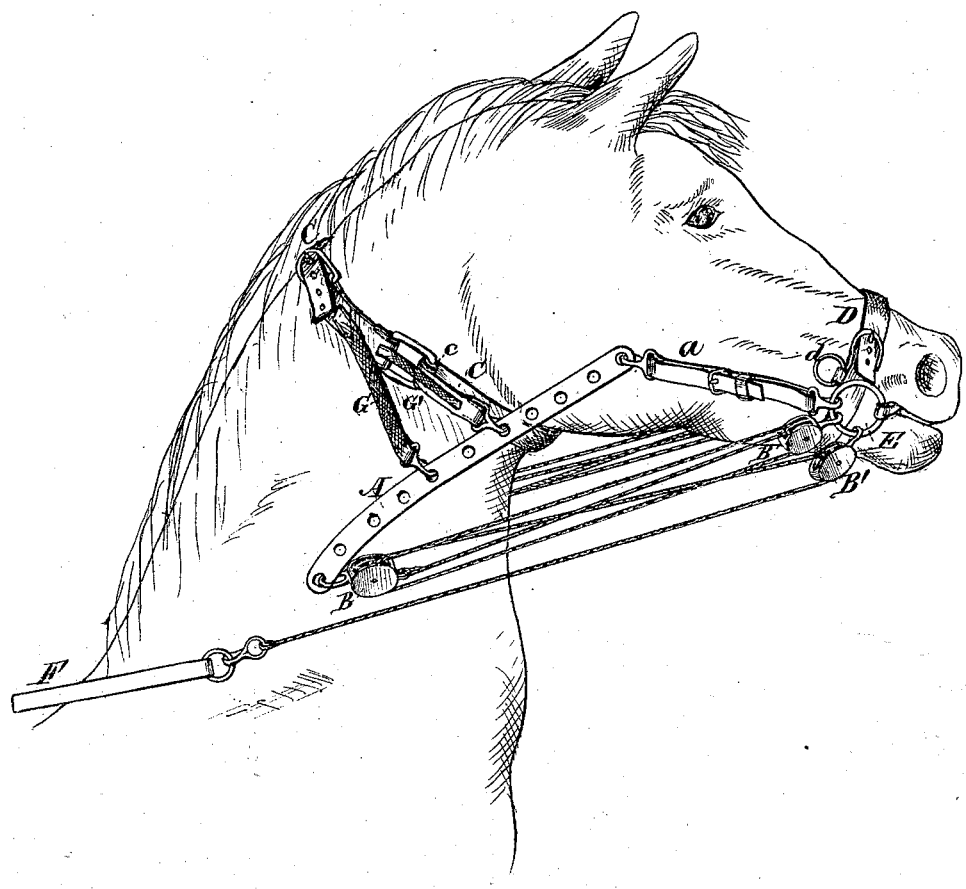
Witnesses.  Inventor:
Edw. F. Brown.  Benjamin Randolph Duval.
Thos. Jewell.

UNITED STATES PATENT OFFICE.

BENJAMIN RANDOLPH DU VAL, OF PORTSMOUTH, VIRGINIA.

IMPROVEMENT IN SAFETY-BRIDLES.

Specification forming part of Letters Patent No. 130,794, dated August 27, 1872.

SPECIFICATION.

I, BENJAMIN RANDOLPH DU VAL, of Portsmouth, in the county of Norfolk and State of Virginia, have invented certain Improvements in Bridles for Controlling Horses, of which the following is a specification:

*Nature and Objects of the Invention.*

The first part of my invention relates to the use of a lever on each side of the horse's head attached, at the fulcrums, to the ends of a throat-strap, which passes over rollers at the ends of the headstall. The lower ends of the levers are fastened to the bit-rings, or to rings near the bit rings, fastened on a strap which is buckled around the horse's mouth. The levers having holes near each other, all their length, are slightly curved downward at their upper ends, and the throat-strap can be fastened higher up or lower down, so as to change their fulcrums to lessen or increase their power. A cord is fastened to the upper end of each lever and runs through a pulley fastened to the bridle-ring or strap-ring, and then to the leather rein. The next part of my invention is a pair of double pulleys (or single, if preferable,) between the upper ends of the levers and the bridle-rings, to the cords of which the reins may be fastened, instead of directly to the upper ends of the levers, whenever it may be preferred to increase the power without lengthening the levers. The third part of my invention is the use of elastic straps or cords, one on each side, from the headstall to the fulcrum of the lever, and another to the upper end of the lever to bring the fulcrums up to their places as soon as the reins are loosened, and to keep the upper ends of the levers near the headstall, and hold them firm enough to allow the ordinary bearing of the reins without choking.

The objects of my invention are to control the horse or other animal by instantly choking him and unchoking him at will, and yet to use the same reins for ordinary driving without any pressure on his throat.

*Description of the Accompanying Drawing.*

Letter A is the lever; letter B, a double pulley; letter B', a single pulley; letter C, the throat-strap; letter $c$, a roller; letter D, the strap around the mouth; letter $d$, a ring on mouth-strap. E is bridle-ring; F, the rein; and G G', elastic straps.

*Claims.*

1. I claim the lever A with its fulcrum attached to the throat-strap, its lower end attached to the bit-ring or to the mouth-strap, and its upper end fastened to the rein, either directly or through pulleys, as shown and described.

2. I claim as my invention the gum-elastic straps or cords, in combination with the levers, substantially and for the purposes as described.

3. I claim as my invention the mouth-strap D, in combination with the lever and throat-strap, to afford the means of choking a horse and driving him without the use of a bit, as shown and described.

BENJAMIN RANDOLPH DU VAL.

Witnesses:
 EDM. F. BROWN,
 THOS. JEWELL.